J. H. Welsh,
Refrigerator.
No. 112,659. Patented Mar. 14, 1871.
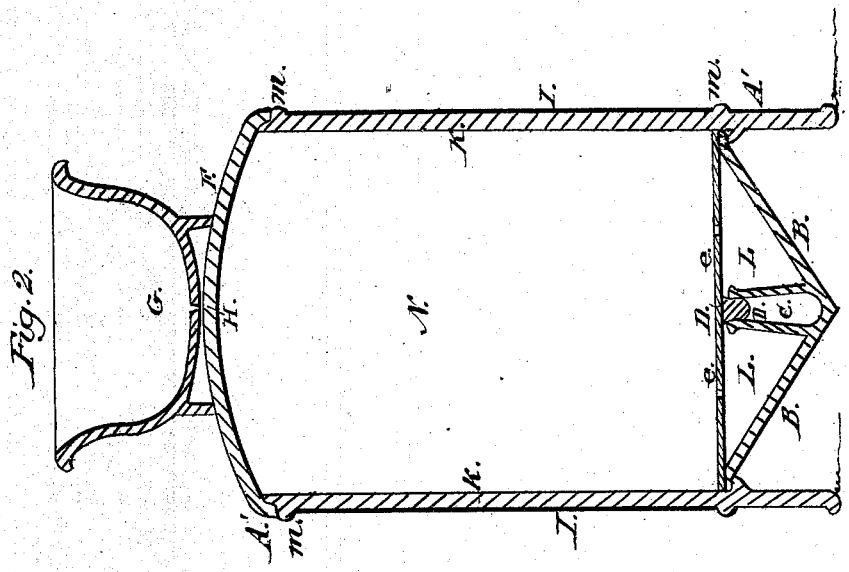
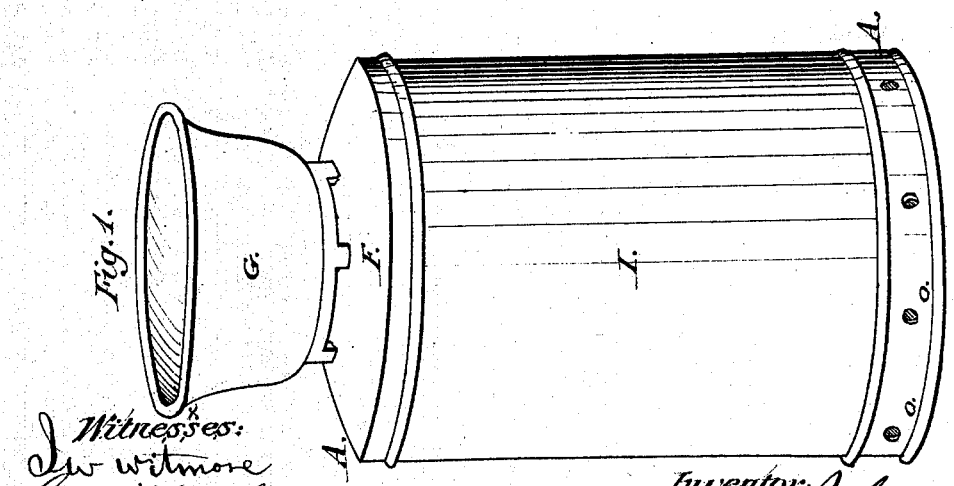
Witnesses:
Jw Witmore
Geo. W. Walker
Inventor:
John H. Welsh

UNITED STATES PATENT OFFICE.

JOHN H. WELSH, OF ERIE, PENNSYLVANIA.

IMPROVEMENT IN REFRIGERATORS.

Specification forming part of Letters Patent No. 112,659, dated March 14, 1871.

*To all whom it may concern:*

Be it known that I, JOHN H. WELSH, of Erie, in the county of Erie and State of Pennsylvania, have invented a new and useful Improvement in Refrigerators; and I do hereby declare that the following is a full, clear, and exact description of the construction and operation of the same, reference being had to the annexed drawings, making a part of this specification, in which—

Figure 1 is a perspective view, and Fig. 2 a vertical section through $x\,y$.

A A, the main body of the refrigerator. This is of earthenware or metal.

B B, the bottom closely fastened to the main body; C, disinfectant-chamber; D, porous stopper of the latter; E, movable bottom, on which the materials to be preserved are placed. It is perforated to allow drippings to pass off.

F, cover of the main body; G, vase to hold a liquid; H, hole in G, through which the liquid will slowly drop down onto the cover G; I, cloth wrapper, covering the main body between the beads M M M M; K K, walls of the refrigerating-chamber; L L, dripping-chamber beneath the movable bottom; M M, moldings or beads to hold the cloth in place; N, refrigerating-chamber.

The apparatus is constructed with a main chamber, A A or A' A' B, in which the articles to be preserved are placed. This is surrounded by a cloth, I, designed to hold moisture and promote evaporation around the surface of A A.

The water-vase G is placed on the cover F, with the opening H in its bottom over the center of the cover.

The concave bottom is a short distance above the floor, and there are air-holes in the base O O, to allow the circulation of the air underneath.

The acid-chamber is located in the center of the concave bottom, beneath the movable bottom, so that the latter may in part rest on it.

The operation is as follows: The material to be kept cool is placed in the refrigerating-chamber N. Water alone, or water with ammonia or other substance to promote its evaporation, is placed in the vase G. It percolates slowly through the opening H, runs down the cover F and sides I I, keeping them wet. The evaporation will abstract the heat from the body of the refrigerator A A and cool the substances in the chamber N. Carbolic acid or other disinfectant is placed in the chamber C. It slowly permeates the cork D, diffuses itself in the chambers L and N, and operates to purify the air and preserve the materials placed in N. The vase G may be movable, as well as attached to the cover F. There may be an air-tight door in the side of A A, to be used instead of the cover F. The main body A A may be square as well as round. There may be a faucet in the bottom B, to drain off the drippings and condensed moisture. There may be a cloth in the cover F, as well as on the sides.

The apparatus may be used as a water-cooler by leaving out the bottom E and the chamber C and using the faucet at the base.

What I claim as my invention, and desire to secure by Letters Patent, is—

1. The vase G on the top of the refrigerator, in combination with the cloth-covered body A A, as and for the purpose specified.

2. The acid-vessel or disinfectant-chamber C, with its porous cork D, the movable bottom E E, the body A A, covering I, and vase G, in combination, constructed and operated substantially as set forth, for the purpose specified.

JOHN H. WELSH.

Witnesses:
J. W. WITMORE,
GEO. W. WALKER.